(12) United States Patent
Paik

(10) Patent No.: US 8,914,374 B2
(45) Date of Patent: Dec. 16, 2014

(54) MUSIC SELECTION SYSTEM AND METHOD IN A VEHICLE

(75) Inventor: Soon Kwon Paik, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 40 days.

(21) Appl. No.: 13/324,615

(22) Filed: Dec. 13, 2011

(65) Prior Publication Data
US 2012/0265785 A1  Oct. 18, 2012

(30) Foreign Application Priority Data
Apr. 14, 2011  (KR) .................. 10-2011-0034861

(51) Int. Cl.
| | | |
|---|---|---|
| G06F 7/00 | (2006.01) | |
| G06F 17/30 | (2006.01) | |
| G11B 19/08 | (2006.01) | |
| G11B 27/10 | (2006.01) | |
| G11B 27/32 | (2006.01) | |

(52) U.S. Cl.
CPC .......... *G11B 19/08* (2013.01); *G06F 17/30764* (2013.01); *G11B 27/105* (2013.01); *G11B 27/322* (2013.01)
USPC .......................................... 707/738; 707/740

(58) Field of Classification Search
CPC .................. G06F 17/30761; G06F 17/30764
USPC ................................................ 707/738, 740
See application file for complete search history.

(56) References Cited

U.S. PATENT DOCUMENTS

| | | | | |
|---|---|---|---|---|
| 6,655,833 | B1* | 12/2003 | Melin | 374/147 |
| 7,680,824 | B2* | 3/2010 | Plastina et al. | 707/737 |
| 8,234,572 | B2* | 7/2012 | Rathi et al. | 715/716 |
| 8,390,469 | B2 | 3/2013 | Crowe | 340/692 |
| 2003/0181822 | A1* | 9/2003 | Victor | 600/558 |
| 2009/0138505 | A1* | 5/2009 | Purdy | 707/104.1 |

FOREIGN PATENT DOCUMENTS

| | | |
|---|---|---|
| KR | 10-2006-0069807 | 6/2006 |
| KR | 10-2008-0017699 A | 2/2008 |
| KR | 10-2009-0021041 | 2/2009 |
| KR | 10-2009-0122705 | 12/2009 |
| KR | 10-2010-0064192 | 6/2010 |
| WO | 0249029 A1 | 6/2002 |
| WO | 2006/120929 A1 | 11/2006 |

* cited by examiner

*Primary Examiner* — Mariela Reyes
(74) *Attorney, Agent, or Firm* — Edwards Wildman Palmer LLP; Peter F. Corless

(57) ABSTRACT

A music selection system and method in a vehicle is provided. The system includes a vehicle traveling information collection unit configured to collect vehicle traveling information, a vehicle exterior environment information collection unit configured to collect vehicle exterior environment information, a vehicle interior environment information collection unit configured to collect vehicle parameter values to enable songs selected by a driver to be matched with the vehicle parameter values and stored in corresponding classification categories, thereby allowing other songs in the same category to be selected and played when the selected song is played.

15 Claims, 3 Drawing Sheets

MUSIC SELECTION SYSTEM AND METHOD IN A VEHICLE

CROSS-REFERENCES TO RELATED APPLICATIONS

This application claims under 35 U.S.C. §119(a) the benefit of priority of Korean patent application No. 10-2011-34861, filed on Apr. 14, 2011, the disclosure of which is hereby incorporated in its entirety by reference.

BACKGROUND OF THE INVENTION

1. Field of the Invention

The present invention relates to a music selection system and method in a vehicle, and more particularly, to a music selection system and method that automatically selects a song by considering vehicle parameters such as, for example, vehicle exterior environment information, vehicle traveling information, vehicle interior environment information, and driver state information, and classifies songs selected by the driver based on the vehicle parameters, such that when a song in a classified category is selected by the driver, the music selection system automatically select songs included in the classified category.

2. Description of the Related Art

Generally, when a driver listens to music in a vehicle, the driver directly selects a desired song and listens to the selected song. However, when the driver searches and selects a song list stored in a multimedia terminal in a vehicle during driving, the driver's eyes are diverted from the road, thereby increasing the risk of an accident.

To address this safety concern, the conventional art has considered several technologies for automatic song selection. For example, one technology measures a driver's heart rate to automatically select a song (see, e.g., Korean patent laid open No. 10-2006-0069807); another technology recognizes an emotional quotient through a driver's biorhythm to automatically select a song (see, e.g., Korean patent No. 10-986527); another technology for selects a song based on a weather state (see, e.g., Korean patent laid open No. 10-2009-0122705).

However, since the related art systems select a song in accordance with only one environmental parameter such as the driver's heart rate, the driver's biorhythm, or the weather without considering the multiple, complex environmental parameters that affect a driver, the driver's satisfaction with the song selection is decreased.

SUMMARY OF THE INVENTION

Various aspects of the present invention have been made in view of the above problems, and to provide a music selection system and method that automatically selects music by considering multiple vehicle parameters such as, for example, vehicle exterior environment information, vehicle traveling information, vehicle interior environment information, and driver state information.

Various aspects of the present invention provide a music selection system and method that classifies songs selected by a driver based on multiple vehicle parameters such as vehicle exterior environment information, vehicle traveling information, vehicle interior environment information, and driver state information, and when the driver selects a song included in one of the classified categories, the music system automatically selects songs included in the classified category.

According to an aspect of the present invention, a music selection system in a vehicle is provided. The system may include: an information collection unit configured to collect at least one vehicle parameter including, but not limited to, vehicle traveling information, vehicle exterior environment information, vehicle interior environment information, and driver state information; and a control unit configured to store songs selected by a driver and matching the stored songs with the information collected by the information collection unit, thereby storing the selected songs in classification categories for the selected songs according to similar vehicle parameter condition information even when the driver selects a song and stores the selected song, and to consecutively select other songs in a classification category, including the selected song, when the selected song is chosen.

The system may further include a storage unit configured to store songs classified in the categories.

When another song is forcibly selected while a selected song is playing, the control unit may determine whether or not the forcibly selected song is included in the same category as the song currently playing, and consecutively play songs in the same category when it is determined that the forcibly selected song is included in the same category.

When another song is forcibly selected while a selected song is playing, the control unit may determine whether or not the forcibly selected song is included in the same category as the song currently playing and consecutively play songs in another category when it is determined that the forcibly selected song is included in the other category.

The storage unit may store the collected information in a binary code.

When the driver repeatedly selects the same song under the same vehicle parameter conditions (such as, e.g., exterior environment information, interior environment information, traveling information, driver state information), the control unit assigns a high reliability score to the classification category of the repeatedly selected song.

According to another aspect of the present invention, a music selection method in a vehicle is provided. The method may include: collecting information about at least one vehicle parameter such as, for example, vehicle traveling information, vehicle exterior environment information, vehicle interior environment information, and driver state information when a song is selected by a driver; classifying the selected song for a specific category and storing the classified song in the specific category; and playing the selected song and consecutively playing the other songs in the category, including the selected song.

When another song is forcibly selected by the driver while the selected song is playing, the method further includes: determining whether or not the forcibly selected song is included in the same category as the song currently playing; consecutively playing songs included in the same category as the song currently playing when it is determined that the forcibly selected song is included in the same category as the currently playing song; and consecutively playing songs included in a different category from that of the song currently playing when it is determined that the forcibly selected song is included in the different category.

The method may further include iteratively collecting the information, storing the selected song, and consecutively playing the selected song, as well as songs included in the same category as the selected song, when the forcibly selected song is not stored.

According to an exemplary embodiment of the present invention, to the system and method automatically selects and provides optimal music selection to the driver by considering multiple vehicle parameters including, but not limited to, exterior environment information, interior environment information, travelling information (such as, for example, speed, revolutions per minute (RPM), throttle position sensor (TPS) of a vehicle, and the like of the vehicle), and driver state information.

The systems and methods of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
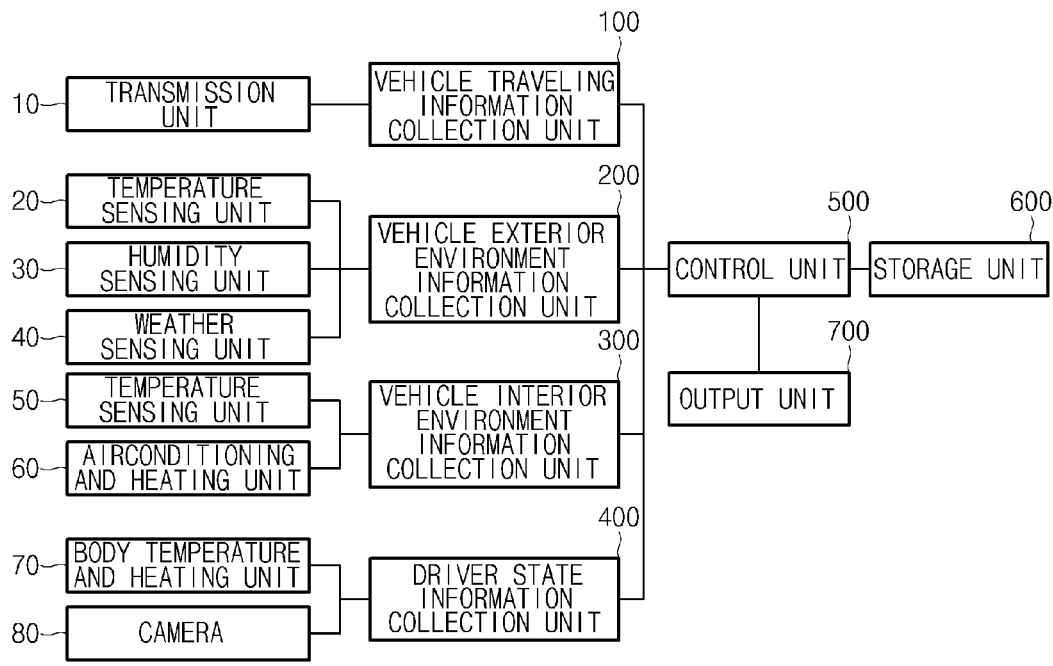
FIG. 1 is a block diagram illustrating a configuration of a music selection system in a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

An exemplary embodiment of the present invention will hereinafter be described in detail with reference to the accompanying drawings, so that a person having ordinary skill in the art pertinent to the present invention may easily carry out the present invention. Like reference numerals in the drawings denote like elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, a music selection system and method in a vehicle according to an exemplary embodiment of the present invention will be described with reference to FIGS. 1 to 3 in detail.

Figure 2:
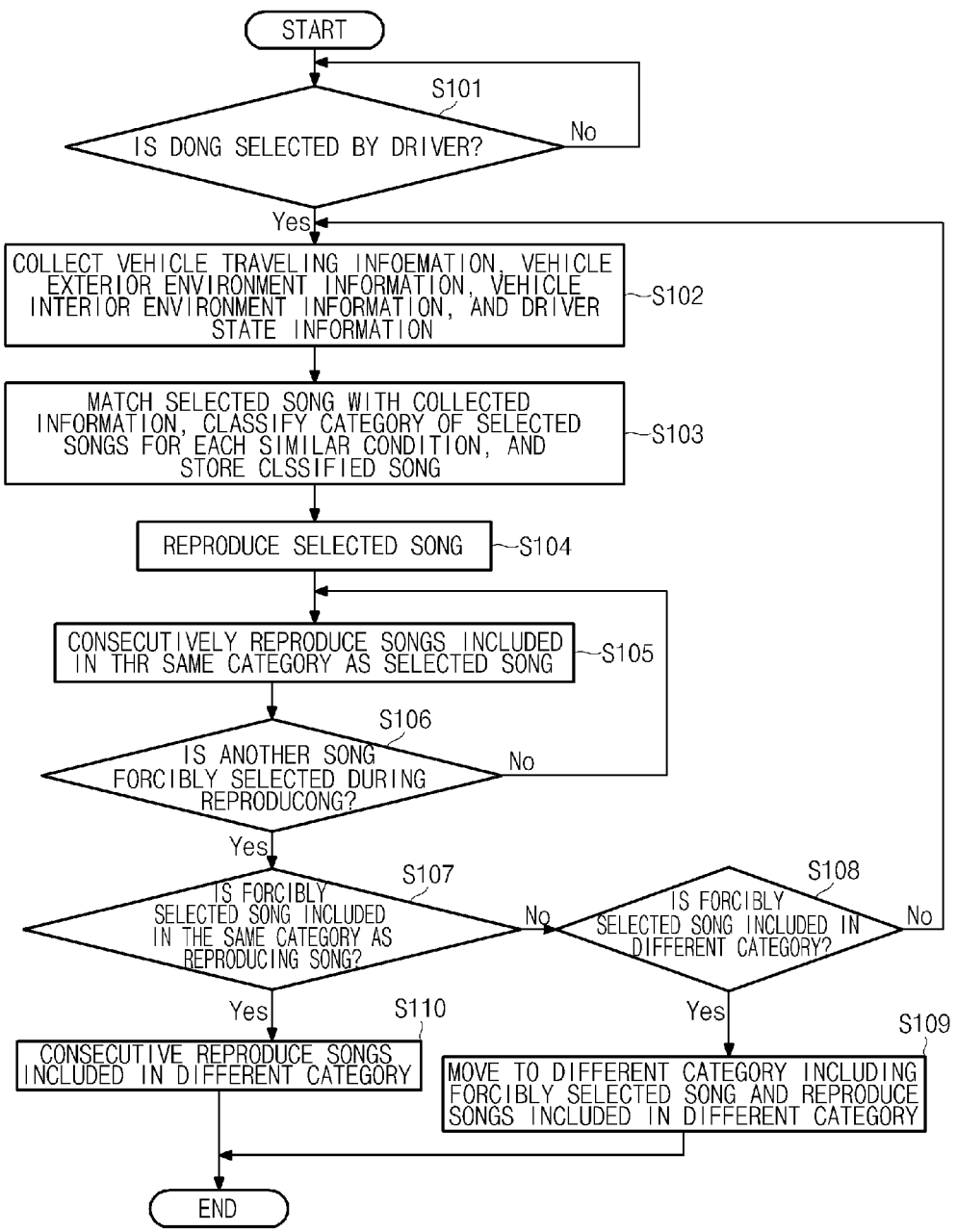
FIG. 2 is a sequence diagram illustrating a music selection method in a vehicle according to an exemplary embodiment of the present invention.

FIG. 1 is a block diagram illustrating a configuration of a music selection system in a vehicle according to an exemplary embodiment of the present invention.

The music selection system according to an exemplary embodiment of the present invention includes a vehicle traveling information collection unit 100, a vehicle exterior environment information collection unit 200, a vehicle interior environment information collection unit 300, a driver state information collection unit 400, a control unit 500, a storage unit 600, and an output unit 700.

The vehicle traveling information collection unit 100 collects vehicle parameters relating to, for example, vehicle traveling environment information including, but not limited to, speed, revolutions per minute (RPM), throttle position from a throttle position sensor (TPS) of a vehicle, other travelling information from a transmission unit 10, and the like of the vehicle.

The vehicle exterior environment collection unit 200 collects vehicle parameters relating to, for example, exterior environment information including, but not limited to, outdoor temperature, outdoor humidity, weather information, and the like, from a temperature sensing unit 20, a humidity sensing unit 30, and a weather sensing unit 40, respectively. The weather sensing unit 40 may include a rain sensor, a snow sensor, a wind sensor, and the like.

The vehicle interior environment information collection unit 300 collects vehicle parameters relating to, for example, the vehicle interior environment information including, but not limited to, indoor temperature, air conditioner/heater operation state, and the like, from a temperature sensing unit 50, and an air conditioning and heating unit 60, respectively. The air conditioning and heating unit 60 includes a heater, air conditioner, and the like.

The driver state information collection unit 400 collects vehicle parameters relating to, for example, driver state information including, but not limited to, the driver's body temperature information, information about whether or not the driver is drowsy, and the like, from a body temperature sensing unit 70, and a camera 80, respectively. The drowsiness of the driver may be determined by imaging the driver's face with camera 80 and determining whether or not the driver blinks. Alternatively, the drowsiness of the driver may be determined by analyzing the body temperature of the driver, and determining, for example, whether the driver's body temperature is high.

The control unit 500 stores in the storage unit 600 the vehicle parameter information collected from the vehicle traveling information collection unit 100, the vehicle exterior environment information collection unit 200, the vehicle interior environment collection unit 300, and the driver state information collection unit 400 by matching the collected information with the song selected by the driver. For example, the control unit 500 classifies a category for the selected song according to condition of the collected information and stores the song in the classification category. The collected information is stored in a binary code as Table 1 below.

TABLE 1

| Classification | | Bit configuration | |
| --- | --- | --- | --- |
| Speed signal | Low speed | 00 | Less than 90 Km/s |
|  | High speed | 11 | Greater than 90 km/s |
| Temperature Indoor/Outdoor) | Low temperature | 00 | Less than 18° C. |
|  | High temperature | 11 | Greater than 18° C. |
| Thermometer | Room temperature | 00 | Less than 37° C. |
|  | High | 11 | Greater than |

TABLE 1-continued

| Classification | Bit configuration | | |
|---|---|---|---|
| | temperature | | 38° C. |
| reliability | Low | 0 | Low |
| | High | 1 | High |

As shown in Table 1, the control unit 500 classifies a speed signal as low speed when the speed signal is less than 90 Km/s and as high speed when the speed signal is greater than 90 Km/s. The control unit 500 classifies an outdoor or indoor temperature as low when the outdoor or indoor temperature is less than 18° C. and as high when the outdoor or indoor temperature is greater than 18° C. The control unit 500 classifies a driver's body temperature as being at room temperature when the driver's body temperature is less than or equal to 37° C. and as at high temperature when the driver's body temperature is greater than or equal to 38° C. The control unit 500 scores song classification reliability as high when repeatability of selection for the same song is high.

The storage unit 600 stores music (i.e., songs) for categories classified by the control unit 500.

The output unit 700 plays the music selected by the driver and outputs the music.

Hereinafter, a music selection method in a vehicle according to an exemplary embodiment of the present invention will be described with reference to FIG. 2.

The control unit 500 determines whether or not a song is selected by a driver (S101). When it is determined that the song is selected by the driver, the collection units 100 to 400 collect vehicle parameters including, but not limited to, traveling information, vehicle exterior environment information, vehicle interior environment information, and driver state information, respectively (S102).

The control unit 500 matches the song selected by the driver with the collected vehicle parameter information to classify a category for the collected vehicle parameter information, and stores the selected song for the classified category (S103).

For example, when 'Return to Pusan Port' is selected, if a current speed is 100 Km/s, an indoor temperature is 15° C., an outdoor is 6° C., and it is raining, the control unit 500 classifies 'Return to Pusan Port' into a category 'when it rains' and stores the classified song.

For example, songs selected by the driver when it is raining are classified into the category 'when it rains' and stored. Songs selected by the driver when it is snowing are classified into a category 'when it snows' and stored. Songs selected by the driver when it is windy are classified into the category 'when its windy' and stored. At this time, the categories 'when it rains', 'when it shows', and 'when its windy' are classified into sub categories according to vehicle parameters including, but not limited to, speed, outdoor temperature, indoor temperature of the vehicle, drowsiness/non-drowsiness of the driver, and/or the on/off state of the air conditioner/heater. In addition, if 'Return to Pusan Port' is frequently selected by the driver when it rains, the control unit 500 assigns a high reliability score of song classification of 'Return to Pusan Port' to the 'when it rains' category.

The categories are variously classified into when an air conditioner is on and the inside of the vehicle is hot, when the vehicle travels at high speed and it is clear, when the driver drives at low speed and is drowsy, when it snows and the vehicle travels at low speed, and the like by combining and analyzing various vehicle parameters including, but not limited to, the vehicle traveling information, the vehicle exterior environment information, the vehicle interior environment information, the driver state information, and the like.

Figure 3:
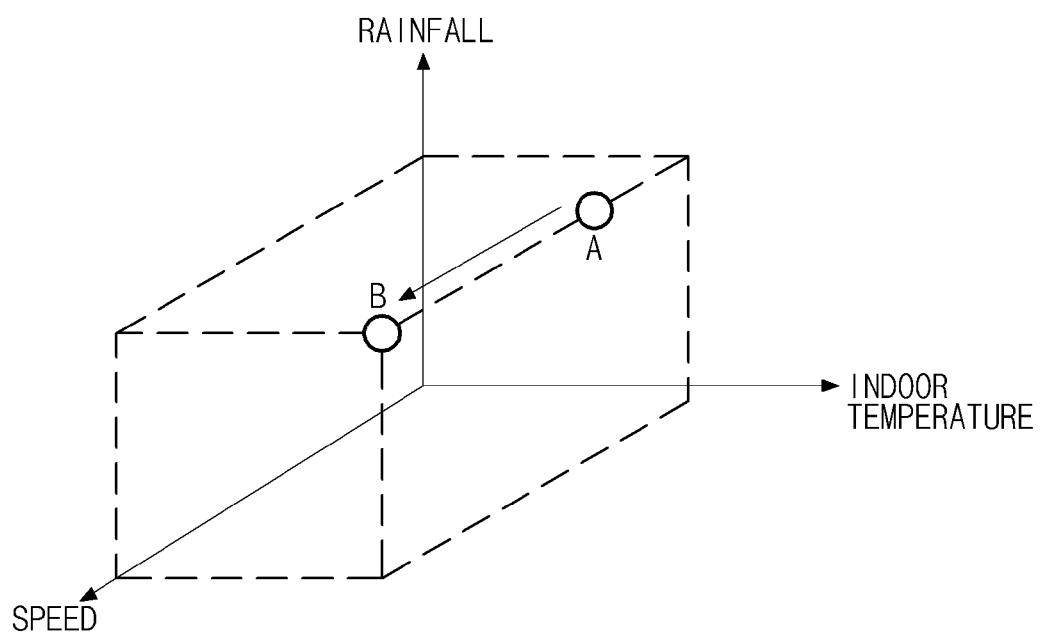
FIG. 3 is a graph illustrating a music selection method according to an exemplary embodiment of the present invention.

As shown in the three dimensional (3D) graph of FIG. 3, a Z-axis may denote the vehicle traveling information (speed), a Y-axis may denote the vehicle exterior environment information (rainfall), and an X-axis may denote the vehicle interior environment information (indoor temperature). When the speed is increased from A to B when the indoor temperature is 20° C. and it is raining a little, the songs (i.e. music) of the classification category which satisfies the condition that the indoor temperature is 20° C., it is raining a little, and the speed is between A and B are selected.

Although the collected information has been illustrated in the 3D graph in FIG. 3, it is possible to provide optimal music selection service to the driver by correlating multiple, or all, vehicle parameters including, but not limited to, exterior environment information, interior environment information, vehicle traveling information, the driver state information, and the like.

The control unit 500 reproduces and outputs the selected song through the output unit 700 (S104) and consecutively plays the other songs included in the classification category, including the selected song, without separate selection by the driver (S105).

In the event that another song is forcibly selected by the driver while a song is playing (S106), the control unit 500 determines whether or not the forcibly selected song is included in the same category as the reproducing song (S107).

If the forcibly selected song is included in the same category as the reproducing song, the control unit 500 consecutively plays songs in the same category (S110). At this time, the forcibly selected song is preferentially played, along with the songs included in the same classification category.

If it is determined that the forcibly selected song is not included in the same category as the reproducing song, the control unit 500 determines whether or not the forcibly selected song is included in a different category from the currently playing song (S108). When it is determined that the forcibly selected song is included in the different category, the control unit 500 preferentially reproduces the forcibly selected song and consecutively plays songs included the different category, including the forcibly selected song (S109).

When it is determined that the forcibly selected song is not included in any classification category, the control unit 500 determines that the forcibly selected song is not classified and stored, and performs the processes S102 to S105 to classify and play the forcibly selected song.

According to the exemplary embodiment of the present invention, music is automatically selected taking into consideration multiple, or all, vehicle parameters including, but not limited to, the vehicle traveling information, the vehicle exterior environment information, the vehicle interior environment information, the driver state information, as well as when the driver selects a song, and a database for the selected songs is built on classification categories to improve song selection reliability, so that the optimal music is automatically selected and provided to the driver.

Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A music selection system in a vehicle, comprising:
    at least one information collection unit configured to collect vehicle traveling information, vehicle exterior environment information, vehicle interior environment information, and driver state information as a value of at least one vehicle parameter;
    a storage unit configured to store songs and the collected value of at least one vehicle parameter; and
    a processor configured to correlate at least the vehicle traveling information, the vehicle exterior environment information, the vehicle interior environment information and the driver state information, and to analyze songs selected by a driver by matching the selected songs with the correlated value of the at least one vehicle parameter, classifying the selected songs into at least one classification category according to the processor analysis of the correlated value of the at least one vehicle parameter, storing the selected song in the storage unit according to the classification category, and consecutively playing other songs in the classification category, including the song selected by the driver, when the selected song is played, wherein the driver state information includes the driver's body temperature information and information regarding whether or not the driver is drowsy,
    wherein the processor is further configured to determine whether or not a second song is included in a first classification category of a first song when the second song is selected manually and forcibly while the first song is playing, to begin playing the second song when a determination is made that the second song is included in the second classification category, and then play songs in a second classification category associated with the second song,
    wherein the processor is further configured to assign a high reliability score to the analysis of the classification category of a song when the driver repeatedly selects the song under conditions when the value of the at least one vehicle parameter is the same, or similar.

2. The music system of claim 1, wherein the storage unit is configured to store songs by classification categories.

3. The music system of claim 2, wherein the storage unit stores the collected information in a binary code.

4. The music system of claim 1, wherein the at least one information collection unit is selected from the group consisting of a vehicle traveling information collection unit, a vehicle exterior environment information collection unit, a vehicle interior environment information collection unit, and a driver state information collection unit.

5. The music system of claim 4, wherein the vehicle traveling information collection unit collects data from a transmission unit.

6. The music system of claim 4, wherein the vehicle exterior environment information collection unit collects data from a unit selected from the group consisting of a temperature sensing unit, a humidity sensing unit, and a weather sensing unit.

7. The music system of claim 4, wherein the vehicle interior environment information collection unit collects data from a unit selected from the group consisting of a temperature sensing unit and an air conditioning sensing unit, and a heating sensing unit.

8. The music system of claim 4, wherein the vehicle driver state information collection unit collects data from a unit selected from the group consisting of a body temperature sensing unit, a heating sensing unit, and a camera unit to determine drowsiness.

9. The music system of claim 1, wherein the processor is configured to determine whether or not a second song is included in the same classification category as a first song when the second song is selected manually and forcibly while the first song is playing, and to continue playing songs in the same classification category as the first song when it is determined that the second song is included in the same classification category as the first song.

10. A music selection method in a vehicle, comprising:
    collecting, by a processor, a vehicle traveling information, a vehicle exterior environment information, a vehicle interior environment information, and a driver state information as a value of at least one vehicle parameter provided by an information collection unit when a song is selected by a driver;
    analyzing and correlating, by the processor, all of the vehicle traveling information, the vehicle exterior environment information, the vehicle interior environment information, and the driver state information to identify a classification category;
    classifying, the processor, the selected song in the classification category;
    storing, by a storage unit, the classified song in a storage unit;
    playing, by the processor, the selected song and consecutively playing the other songs in the classification category, including the selected song;
    determining whether or not a second song is included in a same classification category as a first song when the second song is selected manually and forcibly while the first song is playing;
    continuing to play songs in the same classification category as the first song upon determining that the second song is included in the same classification category as the first song;
    playing the second song and stopping playing the first song when a determination is made that the second song is included in a different classification category than the first song;
    performing iteratively the collecting a value of at least one vehicle parameter provided by an information collection unit;
    storing the selected song;
    playing consecutively songs included in a classification category of the selected second song when the second, manually and forcibly selected, song is not stored in the same classification category as the first song, wherein the driver state information includes the driver's body temperature information and information about whether or not the driver is drowsy; and assigning, by the processor, a high reliability score to the analysis of the classification category of a song when the driver repeatedly selects the song under conditions when the value of the at least one vehicle parameter is the same, or similar.

11. The music selection method of claim 10, wherein the information collection unit is selected from the group consisting of a vehicle traveling information collection unit, a vehicle exterior environment information collection unit, a vehicle interior environment information collection unit, and a driver state information collection unit.

12. The music selection method of claim 10, wherein the storage unit stores the collected information in a binary code.

13. The method of claim 10, further comprising:
determining whether or not a second song is included in the same classification category as a first song when the second song is forcibly selected while the first song is playing; and
continuing to play songs in the same classification category as the first song when it is determined that the second song is included in the same classification category as the first song.

14. The method of claim 13, further comprising:
performing iteratively the collecting a value of at least one vehicle parameter provided by an information collection unit;
storing the selected song; and
playing consecutively songs included in the category of the selected song when the second, manually and forcibly selected, song is not stored.

15. A computer readable medium containing executable program instructions executed by a processor, comprising:
program instructions that collect a vehicle traveling information, a vehicle exterior environment information, a vehicle interior environment information, and a driver state information as a value of at least one vehicle parameter provided by an information collection unit when a song is selected by a driver;
program instructions that identify the selected song;
program instructions that analyze and correlate all of the vehicle traveling information, the vehicle exterior environment information, the vehicle interior environment information, and the driver state information collected from at least one information collection unit and received by a processor at the time when the selected song is selected;
program instructions that identify a classification category for the selected song;
program instructions that store the selected song in the classification category in a storage unit;
program instructions that determine whether or not a second song is included in a same classification category as a first song when the second song is selected manually and forcibly while the first song is playing;
program instructions that continue to play songs in the same classification category as the first song when a determination is made that the second song is included in the same classification category as the first song;
program instructions that play the second song and stopping playing the first song when a determination is made that the second song is included in a different classification category than the first song;
program instructions that perform iteratively the collecting a value of at least one vehicle parameter provided by an information collection unit;
program instructions that store the selected second song;
program instructions that play consecutively songs included in a classification category of the selected second song when the second, manually and forcibly selected, song is not stored in the same classification category as the first song,
wherein the driver state information includes the driver's body temperature information and information about whether or not the driver is drowsy; and
program instructions that assign a high reliability score to the analysis of the classification category of a song when the driver repeatedly selects the song under conditions when the value of the at least one vehicle parameter is the same, or similar.

* * * * *